US009012376B2

(12) United States Patent
Choudhary et al.

(10) Patent No.: US 9,012,376 B2
(45) Date of Patent: Apr. 21, 2015

(54) INULIN AS CORROSION INHIBITOR

(75) Inventors: Yogesh Kumar Choudhary, Pune (IN);
Anupom Sabhapondit, Pune (IN);
Deepak Ranganathan, Karnataka (IN)

(73) Assignee: Halliburton Energy Services, Inc., Houston, TX (US)

( * ) Notice: Subject to any disclaimer, the term of this patent is extended or adjusted under 35 U.S.C. 154(b) by 469 days.

(21) Appl. No.: 13/047,529

(22) Filed: Mar. 14, 2011

(65) Prior Publication Data

US 2012/0238479 A1 Sep. 20, 2012

(51) Int. Cl.
*C04B 33/04* (2006.01)
*C09K 8/60* (2006.01)
*C09K 8/68* (2006.01)
*C09K 3/00* (2006.01)
*C09K 8/54* (2006.01)
*C09K 8/74* (2006.01)
*C23F 11/04* (2006.01)

(52) U.S. Cl.
CPC ... *C09K 8/54* (2013.01); *C09K 8/68* (2013.01); *C09K 8/74* (2013.01); *C09K 2208/32* (2013.01); *C23F 11/04* (2013.01)

(58) Field of Classification Search
USPC .............................. 507/204, 90, 211; 252/396
See application file for complete search history.

(56) References Cited

U.S. PATENT DOCUMENTS

| 4,097,667 | A | | 6/1978 | Holst et al. | |
| 4,474,951 | A | | 10/1984 | Pope | |
| 4,698,168 | A | * | 10/1987 | Briggs | 507/240 |
| 5,304,620 | A | | 4/1994 | Holtmyer et al. | |
| 5,484,903 | A | | 1/1996 | Szablikowski et al. | |
| 5,916,484 | A | * | 6/1999 | Brezinski | 252/391 |
| 7,270,184 | B2 | * | 9/2007 | Kotlar et al. | 166/295 |
| 2002/0082399 | A1 | * | 6/2002 | Kuzee et al. | 536/17.4 |
| 2009/0291861 | A1 | * | 11/2009 | Sawdon | 507/110 |
| 2009/0325825 | A1 | | 12/2009 | Gupta et al. | |
| 2010/0104722 | A1 | * | 4/2010 | Francisca et al. | 426/548 |

FOREIGN PATENT DOCUMENTS

| GB | 2013168 A | 12/1978 |
| WO | WO9964716 | 12/1999 |

OTHER PUBLICATIONS

International Search Report and Written Opinion for WO28880 issued May 14, 2012.
Srivastava, H.C., Ramalingam, K.V. and Chaudhari, Studies on O-(2-Hydroxyethyl) Ethers of Carbohydrates: Part II*-Hydroxyethylation of Carbohydrates with Ethylene Carbonate, Indian Journal of Chemistry, vol. 9, Oct. 1971, pp. 1081-1082.
Gupta, D.V. Satyanarayana, Green Inhibitors—Where Are We?, Paper No. 04406, Presented at Corrosion 2004, NACE International, Houston, Texas, 2004.
Harris, Phillip C., Walters, Harold G., and Bryant, Jason, Prediction of Proppant Transport From Rheological Data, SPE 115298, Presented at SPE Technical Conference and Exhibition, Denver, Sep. 21-24, 2008, pp. 550-555.
Bazin, B., Kohler, A. Zaitoun, Johnson, T and Raaijmakers, H., A New Class of Green Mineral Scale Inhibitors for Squeeze Treatments, SPE 87453, Presented at 6th International Symposium on Oil field Scale held in Aberdeen, UK, May 26-27, 2004.
Christian V. Stevens, Alessia Meriggi, Karl Booten, "Chemical Modification of Inulin, A Valuable Renewable Resource, and Its Industrial Applixations," Bio Macromolecules, Published by the American Chemical Society, vol. 2, No. 1, Spring 2001, 16 pages.
CRC Prevention, Inulin-Noaw.com, Jul. 22, 2004, 53 pages, <www.noaw.com/CRC_Prevention/CRC_Prevention.ppt>.
Roberfroid, Marcel B., et al., The Bifidogenic Nature of Chicory Inulin and Its Hydrolysis Products, The Journal of Nutrition, pp. 11-19 (1998).

* cited by examiner

*Primary Examiner* — Susannah Chung
*Assistant Examiner* — Atnaf Admasu
(74) *Attorney, Agent, or Firm* — Holly Soehnge; Baker Botts L.L.P.

(57) ABSTRACT

Methods of inhibiting corrosion of a metal surface in a well or pipeline are provided. The methods include the steps of: (a) forming a fluid of: (i) an aqueous acid solution; and (ii) inulin; and (b) introducing the fluid into the well or pipeline. The methods have wide application in various kinds of operations involved in the production or transportation of oil and gas, such as acid stimulation or remedial treatment in a pipeline.

23 Claims, No Drawings

INULIN AS CORROSION INHIBITOR

BACKGROUND

1. Technical Field

The inventions generally relate to corrosion inhibition in wells or pipelines.

2. Background Art

Acidic Fluids, Corrosion, and Inhibition

Acidic fluids are present in a multitude of operations in the oil and gas industry. For example, acidic fluids are often used in wells penetrating subterranean formations. Such acidic fluids may be used, for example, in clean-up operations or stimulation operations for oil and gas wells. Acidic stimulation operations may use these treatment fluids in hydraulic fracturing and matrix acidizing treatments. In operations using acidic well fluids, metal surfaces of piping, tubing, pumps, blenders, downhole tools, etc. may be exposed to the acidic fluid.

Acidic fluids are sometimes used in pipelines that are normally used for the transmission of hydrocarbons. For example, acidic fluids may be used in an exothermic reaction to generate heat in a pipeline to help remediate paraffin wax buildup in the pipeline. Paraffin wax deposition is found practically whenever crude oil is produced and transported. Paraffin wax deposition obstructs the flow of oil, lowering oil production and interfering with transportation.

Acidic fluids can include one or more of a variety of acids, such as hydrochloric acid, acetic acid, formic acid, hydrofluoric acid, or any combination. In addition, many fluids used in the oil and gas industry include a water source that may incidentally contain certain amounts of acid, which may cause the fluid to be at least slightly acidic.

As used herein with reference to the problem of corrosion, "acid" or "acidity" refers to a Bronsted-Lowry acid or acidity.

Even weakly acidic fluids can be problematic in that they can cause corrosion of metals. As used herein, the term "corrosion" refers to the loss of metal due to chemical or electrochemical reactions, which could eventually destroy a structure made of the metal. Corrosion can occur anywhere in a well production system, including anywhere downhole in a well or in surface lines and equipment. The corrosion rate will vary with time depending on the particular conditions, such as the amount of water, temperature, and pressure. Examples of common types of corrosion include, but are not limited to, the rusting of metal, the dissolution of a metal in an acidic solution, oxidation of a metal, chemical attack of a metal, electrochemical attack of a metal, and patina development on the surface of a metal.

As used herein, the term "inhibit" refers to slowing down or lessening the tendency of a phenomenon (e.g., corrosion) to occur or the degree to which that phenomenon occurs. The term "inhibit" or "inhibitor" does not imply any particular degree or amount of inhibition. Accordingly, the term "corrosion inhibitor" means a material that has the property of reducing, slowing down, or lessening the tendency to corrosion.

To combat this potential corrosion problem in operations with acidic well fluids, corrosion inhibitors have been used to reduce corrosion to metals and metal alloys with varying degrees of success. A difficulty encountered with the use of some conventional corrosion inhibitors is the limited temperature range over which they may function effectively. For example, certain conventional antimony-based inhibitor formulations have been limited to temperatures above 270° F. and do not appear to function effectively below this temperature.

Another drawback of some conventional corrosion inhibitors is that certain components of these corrosion inhibitors may not be compatible with the environmental standards in some regions of the world. For example, quaternary ammonium compounds, mercaptan-based compounds, and "Mannich" condensation compounds have been used as corrosion inhibitors. However, these compounds generally are not acceptable under stricter environmental regulations, such as those applicable in the North Sea region. Consequently, operators in some regions may be forced to suffer increased corrosion problems, resort to using corrosion inhibitor formulations that may be less effective, or forgo the use of certain acidic treatment fluids.

Yet another drawback of some convention corrosion inhibitors is the high cost.

Producing Oil & Gas

In the context of production from a well, oil (in this context referring to crude oil) and gas (in this context referring to natural gas) are well understood to refer to hydrocarbons naturally occurring in certain subterranean formations. A hydrocarbon is a naturally occurring organic compound comprising hydrogen and carbon, which can be as simple as methane ($CH_4$) or can be a highly complex molecule or anything in between. Petroleum is a complex mixture of hydrocarbons. Oil wells usually produce oil and gas along with water.

A subterranean formation containing oil or gas is sometimes referred to as a reservoir. A reservoir is in a shape that will trap hydrocarbons and that is covered by a relatively impermeable rock, known as cap rock. The cap rock forms a barrier or seal above and around reservoir rock so that fluids cannot migrate beyond the reservoir. Cap rock is commonly shale, anhydrite, or salt. In addition, gas shows from shales during drilling have led some shales to be targeted as gas reservoirs. A reservoir may be located under land or under the seabed off shore. Oil and gas reservoirs are typically located in the range of a few hundred feet (shallow reservoirs) to a few tens of thousands of feet (ultra-deep reservoirs) below the surface of the land or seabed.

As used herein, "subterranean formation" refers to the fundamental unit of lithostratigraphy. A subterranean formation is a body of rock that is sufficiently distinctive and continuous that it can be mapped. In the context of formation evaluation, the term refers to the volume of rock seen by a measurement made through the wellbore, as in a log or a well test. These measurements indicate the physical properties of this volume of rock, such as the property of permeability. A "zone" refers to an interval or unit of rock along a wellbore that is differentiated from surrounding rocks based on hydrocarbon content or other features, such as faults or fractures.

To produce oil or gas from a reservoir, a wellbore is drilled into a subterranean formation, which may be the reservoir or adjacent to the reservoir. The "wellbore" refers to the drilled hole, including a cased or uncased portion of the well. As used herein, the "borehole" refers to the inside wellbore wall, that is, the rock face or wall that bounds the drilled hole. A wellbore can have portions that are vertical and horizontal, and it can have portions that are straight, curved, or branched. The wellhead is the surface termination of a wellbore, which surface may be on land or on a seabed. As used herein, "uphole" and "downhole" and similar terms are relative to the wellhead, regardless of whether a wellbore portion is vertical or horizontal.

As used herein, a "well" includes at least one wellbore. A "well" can include a near-wellbore region of a subterranean formation surrounding a portion of a wellbore that is in fluid communication with the wellbore. As used herein, "into a well" means at least through the wellhead. It can include into any downhole portion of the wellbore and it can include through the wellbore and into a near-wellbore region.

Generally, well services include a wide variety of operations that may be performed in oil, gas, geothermal, or water wells, such as drilling, cementing, completion, and intervention operations. These well services are designed to facilitate or enhance the production of desirable fluids from or through a subterranean formation.

As used herein, a "well fluid" broadly refers to any fluid adapted to be introduced into a well for any well-servicing purpose. A "well fluid" can be, for example, a drilling fluid, a cementing fluid, a treatment fluid, or a spacer fluid. If a well fluid is to be used in a relatively small volume, for example less than about 200 barrels, it is sometimes referred to in the art as a wash, dump, slug, or pill.

Drilling and Drilling Fluids

Drilling is the process of drilling the wellbore. The well is created by drilling a hole, usually about 5 inches (13 cm) to about 36 inches (91 cm) in diameter into the earth (or seabed) with a drilling rig that rotates a drill string with a bit attached. After the hole is drilled, sections of steel pipe, known as casing, which are slightly smaller in diameter than the borehole, are placed in at least the uppermost portions of the borehole. The casing provides structural integrity to the newly drilled wellbore, in addition to isolating potentially dangerous high pressure zones from each other and from the surface.

While drilling an oil or gas well, a drilling fluid is circulated downhole through a drillpipe to a drill bit at the downhole end, out through the drill bit into the wellbore, and then back uphole to the surface through the annular path between the tubular drillpipe and the borehole. The purpose of the drilling fluid is to maintain hydrostatic pressure in the wellbore, to lubricate the drill string, and to carry rock cuttings out from the wellbore.

The drilling fluid is typically oil-based. Oil-based fluids tend to have better lubricating properties than water-based fluids, nevertheless, other factors can mitigate in favor of using a water-based drilling fluid.

In addition, the drilling fluid may be viscosified to help suspend and carry rock cuttings out from the wellbore. Rock cuttings can range in size from fines to chunks measured in centimeters. Carrying capacity is the ability of a circulating drilling fluid to transport rock fragments out of a wellbore. Carrying capacity is an essential function of a drilling fluid, synonymous with hole-cleaning capacity and cuttings lifting. Carrying capacity is determined principally by the annular velocity, hole angle, and flow profile of the drilling fluid, but is also affected by mud weight, cuttings size, and pipe position and movement.

The wellbore may pass through zones that produce water instead of hydrocarbons. Besides being highly undesirable during the production phase, water-producing zones can cause problems in the wellbore with certain drilling and completion activities and associated fluids. For example, the water production may highly dilute the drilling or other treatment fluid in the well. If possible, however, water production is generally ignored during the drilling phase.

Cementing and Hydraulic Cement Compositions

Cementing is a common well operation. For example, hydraulic cement compositions can be used in primary cementing operations during completion in which a string of pipe, such as casing or liner, is cemented in a wellbore. In performing primary cementing, a hydraulic cement composition is pumped as a fluid (typically a suspension or slurry) into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and bonds the exterior surfaces of the pipe string to the walls of the wellbore. Hydraulic cement compositions can also be utilized in remedial cementing operations, such as in plugging highly permeable zones or fractures in near-wellbore regions, plugging cracks or holes in pipe strings, and the like.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

Well Treatments and Treatment Fluids

Completion is the process of making a well ready for production or injection. This principally involves preparing the bottom of the hole to the required specifications, running in the production tubing and associated downhole equipment, as well as perforating and stimulating as required.

Well intervention is any operation carried out on a well during or at the end of its productive life that alters the state of the well or well geometry, provides well diagnostics, or manages the production of the well. Workover can broadly refer to any kind of well intervention involving invasive techniques, such as wireline, coiled tubing, or snubbing. More specifically, though, workover refers to the process of pulling and replacing a completion.

Drilling, completion, and intervention operations can include various types of treatments that are commonly performed on a well or subterranean formation. For example, a treatment for fluid-loss control can be used during any of drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

As used herein, the word "treatment" refers to any treatment for changing a condition of a wellbore or an adjacent subterranean formation. Examples of treatments include fluid-loss control, isolation, stimulation, or conformance control; however, the word "treatment" does not necessarily imply any particular treatment purpose.

A treatment usually involves introducing a treatment fluid into a well. As used herein, a "treatment fluid" is a fluid used in a treatment. The word "treatment" in the term "treatment fluid" does not necessarily imply any particular action by the fluid. If a treatment fluid is to be used in a relatively small volume, for example less than about 200 barrels, it is sometimes referred to in the art as a slug or a pill. Accordingly, as used herein the term "treatment fluid" can be a slug or a pill.

The following are some examples and general descriptions of common well treatments and associated treatment fluids. Of course, other well treatments and treatment fluids are known in the art.

Well Treatment—Fluid-Loss Control

Fluid loss refers to the undesirable leakage of a fluid phase of a well fluid into the permeable matrix of a zone, which zone may or may not be a treatment zone. Fluid-loss control refers to treatments designed to reduce such undesirable leakage. Providing effective fluid-loss control for well fluids during certain stages of well operations is usually highly desirable.

The usual approach to fluid-loss control is to substantially reduce the permeability of the matrix of the zone with fluid-loss control materials that block the permeability at or near the face of the rock matrix of the zone. For example, the fluid-loss control materials may be a particulate that has a size selected to bridge and plug the pore throats of the rock matrix. The higher the concentration of the bridging particles, the faster bridging will occur. As some of the fluid phase carrying the fluid-loss control material leaks into the formation, the fluid-loss control material builds up on the surface of the borehole or fracture face or penetrates only a little into the matrix of the formation. The buildup of solid particulate or other material on the walls of a wellbore or a fracture is referred to as a filter cake. Depending on the nature of a fluid phase and the filter cake, such a filter cake may help block the further loss of a fluid phase (referred to as a filtrate) into the subterranean formation. Fluid-loss control materials are specifically designed to lower the volume of a filtrate that passes through a filter medium, such as a rock matrix.

After application of a filter cake, however, it may be desirable to restore permeability into the rock matrix of the formation. To produce oil or gas from a subterranean formation requires permeability. Any filter cake or any solid or polymer filtration into the matrix of the zone resulting from a fluid-loss control treatment must be removed to restore the formation's permeability, preferably to at least its original level. This is referred to as clean up. If the formation permeability is not restored, production levels from the formation can be significantly lower.

A variety of fluid-loss control materials have been used and evaluated for fluid-loss control and clean-up, including foams, oil-soluble resins, acid-soluble solid particulates, graded salt slurries, linear viscoelastic polymers, and heavy metal-crosslinked polymers. Their respective comparative effects are well documented.

Fluid-loss control materials are sometimes used in drilling fluids or in treatments that have been developed to control fluid loss. A fluid-loss control pill is a treatment fluid that is designed or used to provide some degree of fluid-loss control to a well fluid subsequently introduced into the zone of the well. Through a combination of viscosity, solids bridging, and cake buildup on the porous rock, these pills oftentimes are able to substantially seal off a zone of the subterranean formation from fluid loss. They also generally enhance filter-cake buildup on the face of the formation to inhibit fluid flow into the formation from the wellbore.

Fluid-loss control pills typically comprise an aqueous fluid with a high concentration of a gelling agent polymer, and sometimes bridging particles, like graded sand, potassium salts, or sized calcium carbonate particles. The most commonly used fluid-loss control pills contain high concentrations (100 to 150 lbs/1000 gal) of derivatized hydroxyethylcellulose ("HEC"). HEC is generally accepted as a gelling agent affording minimal permeability damage during completion operations. Normally, HEC polymer solutions do not form rigid gels, but control fluid loss by a viscosity-regulated or filtration mechanism. Some other gelling agent polymers that have been used include guar, guar derivatives, carboxymethylhydroxyethylcellulose ("CMHEC"), and even starch.

As an alternative to forming linear polymeric gels for fluid-loss control, crosslinked gels often are used. Crosslinking the gelling agent polymer creates a gel structure that can support solids as well as provide fluid-loss control. Further, crosslinked fluid-loss control pills have demonstrated that they require relatively limited invasion of the formation face to be fully effective. To crosslink the gelling agent polymers, a suitable crosslinking agent that comprises polyvalent metal ions can be used. Aluminum, titanium, and zirconium are common examples.

A preferred crosslinkable gelling agent for fluid-loss control pills are graft copolymers of a hydroxyalkyl cellulose, guar, or hydroxypropyl guar that are prepared by a redox reaction with vinyl phosphonic acid. The gel is formed by hydrating the graft copolymer in an aqueous solution containing at least a trace amount of at least one divalent cation. The gel is crosslinked by the addition of a Lewis base or Bronsted-Lowrey base so that pH of the aqueous solution is adjusted from slightly acidic to slightly basic. Preferably, the chosen base is substantially free of polyvalent metal ions. The resulting crosslinked gel demonstrates shear-thinning and rehealing properties that provide relatively easy pumping, while the rehealed gel provides good fluid-loss control upon placement. This gel can be broken by reducing the pH of the fluid. Some fluid-loss pills of this type are described in U.S. Pat. No. 5,304,620, assigned to Halliburton Energy Services, the relevant disclosure of which is incorporated herein by reference. Fluid-loss control pills of this type are commercially available under the trade name "K-MAX" from Halliburton Energy Services Inc. in Duncan, Okla.

Well Treatment—Acidizing

A widely used stimulation technique is acidizing, in which a treatment fluid including an aqueous acid solution is introduced into the formation to dissolve acid-soluble materials that clog or constrict formation channels. In this way, hydrocarbon fluids can more easily flow from the formation into the well. In addition, an acid treatment can facilitate the flow of injected treatment fluids from the well into the formation.

Acidizing techniques can be carried out as "matrix acidizing" procedures or as "acid fracturing" procedures.

In matrix acidizing, the acidizing fluid is injected from the well into the formation at a rate and pressure below the pressure sufficient to create a fracture in the formation. The acid permeates into channels and dissolves materials that clog or constrict the channels, thereby increasing permeability of the formation. Thus, an increase in permeability is affected primarily by the reaction of the acid within the formation, and little or no permeability increase is due to induced fractures within the formation.

In acid fracturing, an increase in permeability is affected by fractures as well as by the acid etching through the channels within the formation. The acidic fracturing fluid is injected into the well that is disposed within the formation to be fractured. Sufficient pressure is applied to the acidizing treatment fluid to cause production of one or more fractures in the formation.

Well Treatment—Hydraulic Fracturing

"Hydraulic fracturing," sometimes simply referred to as "fracturing," is a common stimulation treatment. A treatment fluid adapted for this purpose is sometimes referred to as a "fracturing fluid." The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

A "frac pump" is used for hydraulic fracturing. A frac pump is a high-pressure, high-volume pump. Typically, a frac pump is a positive-displacement reciprocating pump. The structure of such a pump is resistant to the effects of pumping abrasive fluids, and the pump is constructed of materials that are resistant to the effects of pumping corrosive fluids. Abrasive fluids include hard, insoluble particulates, such as sand, and corrosive fluids include, for example, acids. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are common.

To fracture a subterranean formation typically requires hundreds of thousands of gallons of fracturing fluid. Further, it is often desirable to fracture at more than one downhole location of a well. Thus, a high volume of fracturing fluid is usually required to treat a well, which means that a low-cost fracturing fluid is desirable. Because of the ready availability and relative low cost of water compared to other liquids, a fracturing fluid is usually water-based.

The creation or extension of a fracture in hydraulic fracturing typically occurs suddenly. When this happens, the fracturing fluid suddenly has a fluid flow path through the fracture to flow more rapidly away from the wellbore, which may be detected as a change in pressure or fluid flow rate.

A newly-created or extended fracture will tend to close together after the pumping of the fracturing fluid is stopped. To prevent the fracture from closing, a material must be placed in the fracture to keep the fracture propped open and provide higher fluid conductivity than the matrix of the formation. A material used for this purpose is referred to as a "proppant."

The proppant is in the form of a solid particulate, which can be suspended in the fracturing fluid, carried downhole, and deposited in the fracture as a "proppant pack." The proppant pack props the fracture in an open condition while allowing fluid flow through the permeability of the pack. A particulate for use as a proppant is selected based on the characteristics of size range, crush strength, and insolubility.

The proppant is an appropriate size to prop open the fracture and allow fluid to flow through the proppant pack, that is, in between and around the proppant making up the pack. Appropriate sizes of particulate for use as a proppant are typically in the range from about 8 to about 100 U.S. Standard Mesh. A typical proppant is sand sized, which geologically is defined as having a largest dimension ranging from 0.06 millimeters up to 2 millimeters (mm). (The next smaller particle size class below sand sized is silt, which is defined as having a largest dimension ranging from less than 0.0625 mm down to 0.004 mm.) Preferably, the proppant has a particulate size distribution range such that at least 90% of the proppant has a size of 0.06 mm to 1.0 mm. For this purpose, "proppant" does not mean or refer to suspended solids, silt, fines, or other types of insoluble particulate smaller than 0.06 mm. Further, it does not mean or refer to particulates larger than 2 mm.

The proppant is sufficiently strong, that is, has a sufficient compressive or crush resistance, to prop the fracture open without being deformed or crushed by the closure stress of the fracture in the subterranean formation. For a proppant material that crushes under closure stress, the proppant preferably has an API crush strength of at least 4,000 psi closure stress based on 10% crush fines for 20/40 mesh proppant or 16% crush fines for 12/20 mesh proppant according to procedure API RP-56. This performance is that of a medium crush-strength proppant, whereas a very high crush-strength proppant would be 10,000 psi. The higher the closing pressure of the formation of the fracturing application, the higher the strength of proppant is needed.

Further, a suitable proppant should not dissolve in fluids commonly encountered in a well environment. Preferably, a material is selected that will not dissolve in water or crude oil.

Suitable proppant materials include, but are not limited to, sand (silica), ground nut shells or fruit pits, sintered bauxite, glass, plastics, ceramic materials, processed wood, resin coated sand or ground nut shells or fruit pits or other composites, and any combination of the foregoing. Mixtures of different kinds or sizes proppants can be used as well. If sand is used, it typically will be from about 20 to about 100 U.S. Standard Mesh in size. For a synthetic proppant, mesh sizes from about 8-100 typically are used.

The proppant pack in the fracture provides a higher-permeability flow path for the oil or gas to reach the wellbore compared to the permeability of the surrounding subterranean formation. This flow path increases oil and gas production from the subterranean formation.

The concentration of proppant in the treatment fluid is preferably in the range of from about 0.03 kilograms to about 12 kilograms of proppant per liter of liquid phase (from about 0.1 lb/gal to about 25 lb/gal).

Well Treatment—Gravel Packing

An insoluble solid particulate also can be used for "gravel packing" operations. The insoluble particulate, when used for this purpose, is referred to as "gravel." More particularly in the oil and gas field and as used herein, the term "gravel" is sometimes used to refer to relatively-large insoluble particles in the sand size classification, that is, particles ranging in diameter from about 0.1 mm up to about 2 mm. Generally, low-strength proppants are used in gravel packing including sand.

Increasing Viscosity of Fluid for Suspending Particulate

Various particulates can be employed in a fluid for use in a well or a fluid can be used to help remove particulates from a well. As used herein, "particulate" or "particulate material" refers to matter in the physical form of distinct particles. The distinct particles have a high tendency to disperse. This tendency may be, for example, because the particles have already been dispersed (e.g., the water molecules of steam) or because the distinct particles are too large to be appreciably affected by Intermolecular Forces (e.g., dust or sand). In the context of oil and gas wells, a particulate can be a material that has particle sizes ranging anywhere from or between that of fines (measured in micrometers) and that of large rock cuttings (up to a few centimeters).

For example, during drilling, rock cuttings should be carried by the drilling fluid and flowed out of the wellbore. The rock cuttings typically have specific gravity greater than 2.

Similarly, a proppant used in hydraulic fracturing typically has a much different density than water. For example, sand has a specific gravity of about 2.7, where water has a specific gravity of 1.0 at room temperature and pressure. A proppant having a different density than water will tend to separate from water very rapidly.

Increasing the viscosity of the water using a viscosity-increasing agent can help prevent a particulate having a different specific gravity than an external phase of the fluid from quickly separating out of the external phase.

Emulsion for Increasing Viscosity

The internal-phase droplets of an emulsion disrupt streamlines and require more effort to get the same flow rate. Thus, an emulsion tends to have a higher viscosity than the external phase of the emulsion would otherwise have by itself. This property of an emulsion can be used to help suspend a particulate material in an emulsion. This technique for increasing the viscosity of a liquid can be used separately or in combination with other techniques for increasing the viscosity of a fluid.

Viscosity-Increasing Agent

A viscosity-increasing agent is sometimes known in the art as a "thickener" or a "suspending agent," but it should be understood that only increasing the viscosity may only slow the settling or separation of distinct phases.

Some viscosity-increasing agents can also help suspend a particulate material by increasing the elastic modulus of the fluid. An example of a viscosity-increasing agent that also increases the elastic modulus of a fluid is a viscoelastic surfactant. An elastic modulus is the measure of a substance's tendency to be deformed non-permanently when a force is applied to it. The elastic modulus of a fluid, commonly referred to as G', is a mathematical expression and defined as the slope of a stress versus strain curve in the elastic deformation region. G' is expressed in units of pressure, for example, Pa (Pascals) or dynes/cm$^2$. As a point of reference, the elastic modulus of water is negligible and considered to be zero.

Water-Soluble Polysaccharides or Derivatives for Increasing Viscosity

A water-soluble polysaccharide can be used to increase the viscosity of a fluid. In general, the purpose of using such a polysaccharide is to increase the ability of the fluid to suspend and carry a particulate material.

A polysaccharide can be classified as being non-helical or helical (or random coil type) based on its solution structure in aqueous liquid media. Examples of non-helical polysaccharides include guar, guar derivatives, and cellulose derivatives. Examples of helical polysaccharides include xanthan, diutan, and scleroglucan, and derivatives of any of these.

As used herein, a "polysaccharide" can broadly include a modified or derivative polysaccharide. As used herein, "modified" or "derivative" means a compound or substance formed by a chemical process from a parent compound or substance, wherein the chemical skeleton of the parent exists in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on a polymeric material may be partial or complete.

A guar derivative can be selected from the group consisting of, for example, a carboxyalkyl derivative of guar, a hydroxyalkyl derivative of guar, and any combination thereof. Preferably, the guar derivative is selected from the group consisting of carboxymethylguar, carboxymethylhydroxyethylguar, hydroxyethylguar, carboxymethylhydroxypropylguar, ethylcarboxymethylguar, and hydroxypropylmethylguar.

A cellulose derivative can be selected from the group consisting of, for example, a carboxyalkyl derivative of cellulose, a hydroxyalkyl derivative of cellulose, and any combination thereof. Preferably, the cellulose derivative is selected from the group consisting of carboxymethylcellulose, carboxymethylhydroxyethylcellulose, hydroxyethylcellulose, methylcellulose, ethylcellulose, ethylcarboxymethylcellulose, and hydroxypropylmethylcellulose.

As used herein, a polysaccharide is considered to be water soluble if it is soluble to the extent of at least 10 mg per liter in deionized water at 25° C. More preferably, the water-soluble polymer is also soluble to the extent of at least 10 mg per liter in an aqueous sodium chloride solution of 32 grams sodium chloride per liter of deionized water at 25° C. If desired, the water-soluble polymer can be mixed with a surfactant to facilitate its solubility in the water or salt solution utilized. The water-soluble polymer can have an average molecular weight in the range of from about 50,000 to 20,000,000, most preferably from about 100,000 to about 3,000,000.

Crosslinking of Polysaccharide to Increase Viscosity of a Fluid or Form a Gel

Because of the high volume of fracturing fluid typically used in a fracturing operation, it is desirable to efficiently increase the viscosity of fracturing fluids to the desired viscosity using as little viscosity-increasing agent as possible. Being able to use only a small concentration of the viscosity-increasing agent requires a lesser amount of the viscosity-increasing agent in order to achieve the desired fluid viscosity in a large volume of fracturing fluid. Efficient and inexpensive viscosity-increasing agents include water-soluble polymers. Typical water-soluble polymers used in well treatments are water-soluble polysaccharides and water-soluble synthetic polymers (e.g., polyacrylamide, etc.). The most common water-soluble polysaccharide employed in well treatments is guar and its derivatives.

The viscosity of a fluid at a given concentration of viscosity-increasing agent can be greatly increased by crosslinking the viscosity-increasing agent. A crosslinking agent, sometimes referred to as a crosslinker, can be used for this purpose. One example of a crosslinking agent is the borate ion. If a polysaccharide is crosslinked to a sufficient extent, it can form a gel with water. Gel formation is based on a number of factors including the particular polymer and concentration thereof, the particular crosslinker and concentration thereof, the degree of crosslinking, temperature, and a variety of other factors known to those of ordinary skill in the art.

A "base gel" is a fluid that includes a viscosity-increasing agent, such as guar, but that excludes crosslinking agents. Typically, a base gel is a fluid that is mixed with another fluid containing a crosslinker, wherein the mixed fluid is adapted to form a gel after injection downhole at a desired time in a well treatment. A base gel can be used, for example, as the external phase of an emulsion.

Breaker for Polysaccharide or Crosslinked Polysaccharide

Drilling or treatment fluids also commonly include a "breaker" for a polysaccharide or crosslinked polysaccharide. In this context of viscosity increase provided by a use of a polysaccharide, the term "break" or "breaker" as used herein refers to a reduction in the viscosity of a fluid or gel by some breaking of the polymer backbones or some breaking or reversing of the crosslinks between polymer molecules. No particular mechanism is necessarily implied by the term. A breaker for this purpose can be, for example, an acid, a base, an oxidizer, an enzyme, a chelating agent of a metal crosslinker, an azo compound, or a combination of these. The acids, oxidizers, or enzymes can be in the form of delayed-release or encapsulated breakers.

In the case of a crosslinked viscosity-increasing agent, for example, one way to diminish the viscosity is by breaking the crosslinks. For example, the borate crosslinks in a borate-crosslinked gel can be broken by lowering the pH of the fluid. At a pH above 8, the borate ion exists and is available to crosslink and cause gelling. At a lower pH, the borate ion reacts with proton and is not available for crosslinking, thus, an increase in viscosity due to borate crosslinking is reversible.

Other Uses of Polysaccharide in Well Fluids

There are other uses for a water-soluble polysaccharide in a well fluids. For example, during the drilling, completion, and stimulation of subterranean a well, it is common to pump a water-based well fluid through tubular goods (e.g., pipes, coiled tubing, etc.) and into a subterranean formation adjacent a wellbore. A considerable amount of energy may be lost due to friction of the water-based well fluid in turbulent flow through the tubular goods of the wellbore. Because of these energy losses, additional pumping horsepower may be necessary to achieve the desired purpose of the well fluid. To reduce these energy losses, a water-soluble polysaccharide may be included in a water-based well fluid. The use of an appropriate water-soluble polysaccharide as a friction reducer in a well fluid is expected to reduce the energy losses due to friction.

For example, in a "high-rate water fracturing treatment," proppant suspension in the treatment fluid is largely achieved by the high rate of pumping and the high flow rate of the treatment fluid. To reduce energy losses due to friction, a water-soluble polysaccharide as a friction reducer may be included in the fracturing fluid. While a fluid used in high-rate water fracturing may contain a water-soluble polysaccharide as a friction-reducing polymer, the polysaccharide is usually included in the fracturing fluid in an amount that is sufficient to provide the desired friction reduction without appreciably viscosifying the fluid and usually without a crosslinker. As a result, the fracturing fluids used in these high-rate water-fracturing operations generally have a lower viscosity than conventional fracturing fluids.

Spacer Fluids

A spacer fluid is a fluid used to physically separate one special-purpose fluid from another. Special-purpose fluids are typically prone to contamination, so a spacer fluid compatible with each is used between the two. A spacer fluid is used when changing well fluids used in a well. For example, a spacer fluid is used to change from a drilling fluid during drilling a well to a cement slurry during cementing operations in the well. In case of an oil-based drilling fluid, it should be kept separate from a water-based cementing fluid. In changing to the latter operation, a chemically treated water-based spacer fluid is usually used to separate the drilling fluid from the cement slurry. Another example is using a spacer fluid to separate two different treatment fluids.

Well Fluid Additives

A well fluid can contain additives that are commonly used in oil field applications, as known to those skilled in the art. These include, but are not necessarily limited to, inorganic water-soluble salts, breaker aids, surfactants, oxygen scavengers, alcohols, scale inhibitors, corrosion inhibitors, fluid-loss additives, oxidizers, and bactericides.

Variations in Well Fluid over Time

Unless the specific context otherwise requires, a "well fluid" refers to the specific properties and composition of a fluid at the time the fluid is being introduced through the wellhead into a wellbore. In addition, it should be understood that, during the course of a well operation such as drilling, cementing, completion, or intervention, or during a specific treatment such as fluid-loss control, hydraulic fracturing, or a matrix treatment, the specific properties and composition of a type of well fluid can be varied or several different types of well fluids can be used. For example, the compositions can be varied to adjust viscosity or elasticity of the well fluids to accommodate changes in the concentrations of proppant desired to be carried down to the subterranean formation from initial packing of the fracture to tail-end packing. It can also be desirable to accommodate expected changes in temperatures encountered by the well fluids during the course of the treatment. By way of another example, it can be desirable to accommodate the longer duration that the first treatment fluid may need to maintain viscosity before breaking compared to the shorter duration that a later-introduced treatment fluid may need to maintain viscosity before breaking. Changes in concentration of the proppant, viscosity-increasing agent, or other additives in the various treatment fluids of a treatment operation can be made in stepped changes of concentrations or ramped changes of concentrations.

Continuum Mechanics and Rheology

One of the purposes of identifying the physical state of a substance and measuring the viscosity of a fluid substance is to establish whether it is pumpable under the ranges of physical conditions that may be encountered at a wellhead and with the types and sizes of pumps available to be used for pumping fluids into a well. Another purpose is to determine what the physical state of the substance and its physical properties will be during pumping through a wellbore and under other downhole conditions in the well, including over time and changing temperatures, pressures, and shear rates. For example, in some applications, a well fluid forms or becomes a gel under downhole conditions that later is broken back to a fluid state.

Continuum mechanics is a branch of mechanics that deals with the analysis of the kinematics and the mechanical behavior of materials modeled as a continuous mass rather than as discrete particles. Rheology is the study of the flow of matter: primarily in the liquid state, but also as "soft solids" or solids under conditions in which they respond with plastic flow rather than deforming elastically in response to an applied force. It applies to substances that have a complex structure, such as muds, sludges, suspensions, gels, etc. The flow of such substances cannot be characterized by a single value of viscosity, which varies with temperature, pressure, and other factors. For example, ketchup can have its viscosity reduced by shaking (or other forms of mechanical agitation) but water cannot.

As used herein, if not other otherwise specifically stated, the physical state of a substance (or mixture of substances) and other physical properties are determined at a temperature of 77° F. (25° C.) and a pressure of 1 atmosphere (Standard Laboratory Conditions).

Fluid State and Apparent Viscosity

In general, a fluid is an amorphous substance that is or has a continuous phase and that tends to flow and to conform to the outline of its container. Examples of fluids are gases and liquids. A gas (in the sense of a physical state) refers to an amorphous substance that has a high tendency to disperse and a relatively high compressibility. A liquid refers to an amorphous substance that has little tendency to disperse and relatively high incompressibility. The tendency to disperse is related to Intermolecular Forces (also known as van der Waal's Forces).

Viscosity is the resistance of a fluid to flow. In everyday terms, viscosity is "thickness" or "internal friction." Thus, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate. The viscosity of a fluid is usually expressed in units of centipoise ("cP").

The physical state of a substance and the viscosity of a fluid are highly dependent on the nature of the substance and the physical conditions, primarily temperature and pressure. In addition, the physical state and the viscosity of a fluid may depend on shear stress and shear rate and the viscosity may vary over time with continuing shear. Newton's law of viscosity is an approximation that holds for some substances but not others. Newtonian fluids, such as water and most gases, have a constant viscosity with rate of shear. Non-Newtonian fluids exhibit a more complicated relationship between shear stress and velocity gradient than simple linearity. Thus, there exist a number of forms of viscosity. Shear thickening fluids have a viscosity that increases with the rate of shear. Shear thinning fluids have a viscosity that decreases with the rate of shear. Thixotropic fluids become less viscous over time when shaken, agitated, or otherwise stressed. Rheopectic fluids become more viscous over time when shaken, agitated, or otherwise stressed. A Bingham plastic is a material that behaves as a solid at low stresses but flows as a viscous fluid at high stresses.

There are numerous ways of measuring and modeling viscous properties, and new developments continue to be made. The methods depend on the type of fluid for which viscosity is being measured. A typical method for quality assurance or quality control (QA/QC) purposes uses a couette device, such as a Fann Model 50 viscometer, that measures viscosity as a function of time, temperature, and shear rate. The viscosity-measuring instrument can be calibrated using standard viscosity silicone oils or other standard viscosity fluids. Due to the geometry of most common viscosity-measuring devices, however, large particles of solid particulate, such as proppant or gravel used in certain well treatments, would interfere with the measurement. Therefore, the viscosity of a fluid containing such large solid particulate is usually inferred by measuring the viscosity of a test fluid that is similar to the fracturing fluid without any proppant included. Another method uses a Proppant Transport Measuring Device (PTMD) (see SPE 115298), which allows the measurement of the viscosity of a fluid containing a proppant. The PTMD instrument is preferably calibrated against a more conventional instrument, for example, against a Fann Model 50 viscometer.

Gel State and Deformation

A gel state is a semi-solid, jelly-like state that can have properties ranging from soft and weak to hard and tough. Shearing stresses below a certain finite value fail to produce permanent deformation. The minimum shear stress which will produce permanent deformation is known as the shear or gel strength of the gel.

Substance of a Fluid or Gel can be a Dispersion

A dispersion is a system in which particles are dispersed in a external phase of a different composition or physical state. A dispersion can be classified a number of different ways, including based on the size of the dispersed-phase particles, whether or not precipitation occurs, and the presence of Brownian motion. For example, a dispersion can be considered to be homogeneous or heterogeneous based on being a solution or not, and if not a solution, based on the size of the dispersed-phase particles (which can also refer to droplet size in the case of a dispersed liquid phase).

The substance of a fluid can be a single chemical substance or a dispersion. For example, water (a liquid under Standard Laboratory Conditions) is a single chemical by that name. An aqueous salt solution is a dispersion.

The substance of a gel is a dispersion. The gel state is formed by a network of interconnected molecules, such as of a crosslinked polymer or of micelles, with other molecules in liquid form. The network gives a gel material its structure (hardness) and contributes to stickiness (tack). By weight, the substance of gels is mostly liquid, yet they behave like solids due to the three-dimensional network with the liquid. At the molecular level (nanometer scale), a gel is a dispersion in which the network of molecules is the continuous (external) phase and the liquid is the discontinuous (internal) phase; however, the gel state, although heterogeneous, is generally considered to be a single phase.

In addition, a dispersion can be a foam, which is a liquid that includes a dispersion of undissolved gas bubbles that foam the fluid, usually with the aid of a chemical (a foaming agent) to achieve stability.

Classification of Dispersions: Homogeneous and Heterogeneous

A dispersion is considered to be homogeneous if the dispersed phase particles are dissolved in solution or the particles are less than about 1 nanometer in size.

A solution is a special type of homogeneous mixture. A solution is homogeneous because the ratio of solute to solvent is the same throughout the solution and because solute will never settle out of solution, even under powerful centrifugation. An aqueous solution, for example, saltwater, is a homogenous solution in which water is the solvent and salt is the solute.

Except for the special case of a solution, a dispersion is considered to be heterogeneous if the dispersed-phase particles are greater than about 1 nanometer in size. (For reference, the diameter of a molecule of toluene is about 1 nm).

Classification of Heterogeneous Dispersions: Colloids and Suspensions

Dispersions can be further classified based on particle size and other characteristics.

A heterogeneous dispersion is a "colloid" where the dispersed-phase particles are in the range of about 1 nanometer to about 1 micrometer in size. Typically, the dispersed-phase particles of a colloid have a diameter of between about 5 to about 200 nanometers. Such particles are normally invisible to an optical microscope, though their presence can be confirmed with the use of an ultramicroscope or an electron microscope.

A heterogeneous dispersion is a "suspension" where the dispersed-phase particles are larger than about 1 micrometer. Such particles can be seen with a microscope, or if larger than about 0.1 mm, with the naked eye.

Classification of Colloids or Suspensions: External Phase

Colloids or suspensions can have solid, liquid, or gas as the external phase.

In the cases where the external phase of a dispersion is a liquid, for a colloidal fluid the dispersed-phase particles are so small that they do not settle. Unlike colloids, however, a suspension of particles dispersed in a liquid external phase will eventually separate on standing, e.g., settle in cases where the particles have a higher density than the liquid phase. Suspensions having a liquid external phase are essentially unstable from a thermodynamic point of view; however, they can be kinetically stable over a large period of time, depending on temperature and other conditions.

An example of a suspension of a solid in a liquid would be sand in water. In case the dispersed-phase particles are liquid in an external medium that is another liquid, this kind of suspension is more particularly referred to as an emulsion. Suspensions and emulsions are commonly used as well fluids.

Emulsions

More particularly, an emulsion is a dispersion of immiscible liquid as droplets into an external liquid phase. In addition, the proportion of the external and internal phases is above the solubility of either in the other. A chemical (an emulsifier or emulsifying agent) can be included to reduce the interfacial tension between the two immiscible liquids to help with stability against coalescing of the internal liquid phase.

An emulsion can be an oil-in-water (o/w) type or water-in-oil (w/o) type. A water-in-oil emulsion is sometimes referred to as an invert emulsion. In the context of an emulsion, the "water" phase refers to water or an aqueous solution and the "oil" phase refers to any non-polar organic liquid, such as petroleum, kerosene, or synthetic oil.

It should be understood that multiple emulsions are possible, which are sometimes referred to as nested emulsions. Multiple emulsions are complex polydispersed systems where both oil-in-water and water-in-oil emulsions exist simultaneously in the fluid, wherein the oil-in-water emulsion is stabilized by a lipophillic surfactant and the water-in-oil emulsion is stabilized by a hydrophilic surfactant. These include water-in-oil-in-water (w/o/w) and oil-in-water-in-oil (o/w/o) type multiple emulsions. Even more complex polydispersed systems are possible. Multiple emulsions can be formed, for example, by dispersing a water-in-oil emulsion in water or an aqueous solution, or by dispersing an oil-in-water emulsion in oil.

Classification of Fluids: Water-Based or Oil-Based

The continuous phase of a substance as a whole is the most external phase, regardless of the number of phases. As used herein, a "water-based fluid" means that water or an aqueous solution is the continuous phase of the fluid as a whole. In contrast, an "oil-based fluid" means that oil is the continuous phase of the fluid as a whole.

Pipelines, Pipeline Fluids, and Pipeline Corrosion

Hydrocarbon is typically produced from a well at relatively high temperature compared to ambient conditions on the surface. After a hydrocarbon flows from a subterranean formation into the production tubulars of the wellbore, it is transported through the tubulars of the wellbore to the wellhead. Further, the hydrocarbon produced at the wellhead must be transported to a refinery to be processed and separated into various components, e.g., to make various grades of fuels and oils. A common method of transporting hydrocarbon is through pipelines. Pipelines are at or near the surface of the ground or can be subsea at or near the seabed. The temperature of the pipelines is much lower than the temperature of the subterranean formation.

As crude oil flows through the production tubulars from the hydrocarbon-bearing formation through the wellbore toward the surface, the surrounding temperature of the wellbore tends to decline toward the surface, allowing heat to dissipate from the fluid and causing the hydrocarbon fluid to begin to cool. Further, as the crude oil is moved through cross-country pipelines, it can lose heat energy to the ground or environment and cool to a temperature well below 120° F. (49° C.). Thus, the hot crude oil from a subterranean formation tends to be cooled as it flows through these conduits.

As the temperature of the crude oil falls, paraffin wax in the crude oil tends to become a solid, waxy material that falls out of the crude oil and paraffin deposits accumulate on the inner walls of the production tubing and pipelines. This can be particularly problematic in subsea pipelines because the surrounding water on the seafloor is very cold, typically about 39° F. (4° C.).

To help prevent paraffin deposits, some cross-country pipelines are heated, which is very costly. However, this is not feasible for subsea pipelines, which are in direct contact with the surrounding cold seawater.

As the paraffin wax deposits build up on the inside wall of a conduit, the opening for fluid flow through the pipeline becomes smaller and smaller. Unless at least some of the buildup is removed from time to time, eventually the deposits can increase to the point where the conduit becomes choked. Also, sometimes some of the paraffin deposits will release from the inside wall of a pipeline and cause a blockage. Such a blockage can occur anywhere in the pipeline. This paraffin deposition leads to reduced crude oil flow and under extreme conditions leads to complete blockage of the pipelines.

Removal of the paraffin wax deposits is attempted through three main approaches: mechanical, thermal, and chemical. Often, a combination of two or more of these types of approaches is employed. One of the thermal-chemical approaches is to use an acid-base reaction to generate heat, but this can also expose the metal of the pipeline to acid corrosion.

SUMMARY OF THE INVENTION

According to one embodiment of the invention, methods of inhibiting corrosion of a metal surface in a well are provided. The methods include the steps of: (a) forming a well fluid of: (i) an aqueous acid solution; and (ii) inulin; and (b) introducing the well fluid into the well.

According to another embodiment of the invention, a methods of inhibiting corrosion of a metal surface in a pipeline are provided. The methods include the steps of: (a) forming a pipeline fluid of: (i) an aqueous acid solution; and (ii) inulin; and (b) introducing the pipeline fluid into the pipeline.

The features and advantages of the present invention will be apparent to those skilled in the art. While numerous changes may be made by those skilled in the art, such changes are within the spirit of the invention.

DETAILED DESCRIPTION OF PRESENTLY PREFERRED EMBODIMENTS AND BEST MODE

General Definitions and Usages

As used herein, the words "comprise," "have," "include," and all grammatical variations thereof are each intended to have an open, non-limiting meaning that does not exclude additional elements or steps.

As used herein, a material is considered to be "soluble" in a liquid if at least 10 grams of the material can be dissolved in one liter of the liquid when tested at 77° F. and 1 atmosphere pressure and considered to be "insoluble" if less than that.

Unless otherwise specified, any ratio or percentage means by weight.

As used herein, "% wt/vol" means the mass-volume percentage, sometimes referred to as weight-volume percentage or percent weight per volume and often abbreviated as % ink or % w/v, which describes the mass of the solute in 40 g per 100 mL of the liquid. Mass-volume percentage is often used for solutions made from a solid solute dissolved in a liquid. For example, a 40% w/v sugar solution contains 40 g of sugar per 100 mL of liquid.

Unless otherwise specified, any doubt regarding whether units are in U.S. or Imperial units, where there is any difference U.S. units are intended herein. For example, "gal/Mgal" means U.S. gallons per thousand U.S. gallons.

As used herein, "first," "second," or "third" may be arbitrarily assigned and are merely intended to differentiate between two or more fluids, aqueous solutions, etc., as the case may be. Furthermore, it is to be understood that the mere use of the term "first" does not require that there be any "second," and the mere use of the word "second" does not require that there by any "third," etc.

Unless otherwise specified, as used herein, the viscosity of a fluid is measured at 511 sec-1 and at room temperature of about 77° F. (25° C.).

Inulin as a Corrosion Inhibitor

Inulin is used in some plants as a means of storing energy and is typically found in roots or rhizomes from the Compositae family of plants. For example, inulin can be commercially extracted from roots of the chicory plant. Chicory is a bush perennial plant available in many parts of the world. Fresh chicory root may contain between 13 and 23% inulin, by total weight. By dry weight, fresh chicory typically contains about 68% inulin, 14% sucrose, 5% cellulose, 6% protein, 4% ash, and 3% other compounds. Dried chicory root extract contains, by weight, approximately 98% inulin and 2% other compounds.

Both extracted inulin and fresh or dried chicory are used in foods, are environmentally friendly, and, being of plant origin, are widely recognized as being biodegradable in nature. Inulin is conventionally used in food applications as a sugar or fat replacement. Inulin is considered to be prebiotic in nature. Prebiotics are defined as non-digestible food ingredients that stimulate the growth or activity of bacteria. The root of the chicory plant can be roasted and ground for use a coffee substitute and additive.

Inulin belongs to the class of fibers known as fructans. Inulins are polymers composed mainly of fructose units, and typically have a terminal glucose. The fructose units in inulins are joined by a β(2→1) glycosidic bond. In general, plant inulins contain between 20 and several thousand fructose units.

As shown below, inulin can be used as a corrosion inhibitor. Chicory is an example of a readily available plant source for inulin.

Corrosion weight-loss tests were performed as follows. A metal alloy specimen was cleaned by degreasing with acetone followed by removal of the surface scale by lightly beadblasting the surface.

Test fluids were prepared, with mixing throughout, by adding the additives to aqueous fluid followed by addition of the appropriate amount of an acid to give the desired acid strength. Chicory powder is readily available commercially as a food ingredient. Inulin in powder form is commercially available as "Orafti HP" from BENEO-Orafti in Belgium.

The metal alloy specimen of approximate surface 4.4 in$^2$, was weighed and placed into 100 mL of a test fluid in a glass container. The container with the test fluid and the alloy specimen were placed in an autoclave, which was closed, then pressurized with nitrogen to 1,000 psi, and finally heated to a test temperature. The test duration (time in hours) was the total contact time of the test fluid on the specimen.

At the end of the test time, the alloy specimen (sometimes referred to by persons of skill in the art as a "coupon") was removed from the test fluid, then cleaned with acetone and a light brushing to remove surface deposits, and finally dried and weighed.

Experimental details and test results are shown in Table 1, which shows that inulin or chicory provide corrosion inhibition. The corrosion inhibiting effect of the inulin or chicory is improved when used in conjunction with a commercially available intensifier, HII-124B or Hexamethylenetetramine. HII-124B (which is an acid inhibitor intensifier) is available from Halliburton Energy Services, Inc. in Duncan, Okla.

TABLE 1

Corrosion Test Results

| Temp (°F.) | Time (hr) | Additive (wt/vol) | Additive (wt/vol) | Additive (wt/vol) | Corrosion Loss (lb/ft$^2$) 13Cr-L80 | N-80 |
|---|---|---|---|---|---|---|
| 15% HCl Test Fluid | | | | | | |
| 150 | 6 | — | — | — | — | 0.189 |
| 150 | 6 | 1% Inulin | — | — | — | 0.03 |
| 150 | 6 | 0.36% Inulin | — | — | — | 0.085 |
| 150 | 6 | 1% Chicory | — | — | — | 0.042 |
| 150 | 6 | 0.36% Chicory | — | 0.12% HII-124B | — | 0.016 |
| 150 | 6 | — | — | 0.12% HII-124B | — | 0.095 |
| 150 | 3 | — | — | — | 0.14 | — |
| 150 | 3 | 1% Chicory | 0.2% Hexamethylenetetramine | 0.12% HII-124B | 0.008 | — |
| 200 | 3 | — | — | — | — | 0.258 |
| 200 | 3 | 1% Inulin | — | — | — | 0.197 |
| 200 | 3 | 1% Inulin | 0.1% Hexamethylenetetramine | — | — | 0.039 |
| 200 | 3 | — | 0.1% Hexamethylenetetramine | — | — | 0.174 |
| 250 | 3 | — | — | — | — | 0.378 |
| 250 | 3 | 2% Inulin | — | 0.12% HII-124B | — | 0.274 |
| 250 | 3 | 2% Chicory | 0.2% Hexamethylenetetramine | 0.12% HII-124B | — | 0.13 |
| 250 | 3 | 2 wt % Chicory | 0.5% Hexamethylenetetramine | 0.24% HII-124B | — | 0.108 |
| 28% HCl Test Fluid | | | | | | |
| 150 | 3 | — | — | — | — | 0.24 |
| 150 | 3 | 2% Inulin | — | — | — | 0.135 |
| 150 | 3 | 2% Inulin | 0.2% Hexamethylenetetramine | — | — | 0.039 |

Corrosion Inhibition Applications

According to the inventions, methods of inhibiting corrosion of a metal surface in a well when contacted by a fluid comprising an aqueous acid solution are provided. In general, the methods include the steps of: (a) forming a well fluid comprising: (i) an aqueous acid solution; and (ii) inulin; and (b) introducing the well fluid into the well. The inulin acts as a corrosion inhibitor.

For example, the aqueous acid solution can contain an acid selected from the group consisting of: hydrochloric acid, hydrofluoric acid, formic acid, acetic acid, citric acid, and any mixture thereof present in the aqueous acid solution in an amount in the range of from about 2% to about 35% by weight of water in the solution.

Inulin used in the methods according to the invention can be extracted from plant material containing inulin. It is believed, however, that it is not necessary to extract the inulin from the plant material. For example, a rhizome of the Compositae family of plants, which includes inulin, can be used as a source of the corrosion inhibitor. The other materials of the rhizome are not expected to interfere in the applications of the methods according to the inventions. If it is determined that any of the other materials of the rhizome interfere in a particular application in a well, extracted inulin is preferred. Chicory is a rhizome of the Compositae family of plants. According to a presently most preferred embodiment, chicory is used as a low-cost source of inulin.

Preferably, the inulin or source of inulin is in the form of a particulate prior to the step of combining with the aqueous acid solution. Most preferably, the size of the particulate of the corrosion inhibitor is in the range of a powder. The particulate may be suspended in a liquid for ease of handling and mixing prior to the step of combining. For example, the corrosion inhibitor can be suspended in an oil phase.

According to a further embodiment, the inulin is combined with the aqueous acid solution in an amount in the range of from about 0.01% wt/vol to about 5% wt/vol of the aqueous acid solution. More preferably, the inulin is combined with the aqueous acid solution in an effective amount to provide at least measurable corrosion inhibition for the metal to be contacted by the well fluid in the well under the conditions of contacting.

It is to be understood that the well fluid can be, for example, in the form of a suspension or an emulsion during the step of contacting.

Preferably, the well fluid is a water-based fluid during the step of contacting.

A well fluid for use in a method according to the invention can include a water-soluble polysaccharide or water-soluble polysaccharide derivative. A well fluid for use in a method according to the invention can include a cross-linker for a water-soluble polysaccharide or water-soluble polysaccharide derivative. A well fluid for use in a method according to the invention can include, for example, one or more additives selected from the group consisting of inorganic water-soluble salts, weighting agents, surfactants, surface modifying agents, gas, nitrogen, carbon dioxide, foamers, bases, buffers, alcohols, fluid-loss control additives, conventional corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, oxidizers, breakers, breaker aids, relative permeability modifiers, particulate materials, proppant particulates, resins, tackifying agents, wetting agents, coating enhancement agents, and any combination thereof.

The method can further include the step of flowing back at least some of the well fluid from the well after contacting the metal surface in the well.

The methods can be used for various types of well or pipeline fluids comprising an aqueous acid solution and associated methods. For example, the methods have particular application with matrix acidizing or acid fracturing fluids, which are strongly acidic. The methods also have particular application in hydrocarbon transmission pipelines that use acidic fluids.

Metals commonly used in wells or pipelines include J55 steel, N-80 steel, P-110 steel, 13Cr alloy, 25 Cr alloy, 825 alloy, and 316L steel.

The corrosion inhibition is effective even when the well or pipeline fluid contacts the metal surface at a temperature of less than 270° F.

CONCLUSIONS

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of inhibiting corrosion of a metal surface in a well, the method comprising the steps of:
    (a) forming a well fluid comprising:
        (i) an aqueous acid solution, wherein the aqueous acid solution contains an acid selected from the group consisting of: hydrochloric acid, hydrofluoric acid, formic acid, acetic acid, citric acid, and any mixture thereof present in the aqueous acid solution in an amount in the range of from about 2% to about 35% by weight of water in the solution; and
        (ii) inulin according to the following chemical structure:

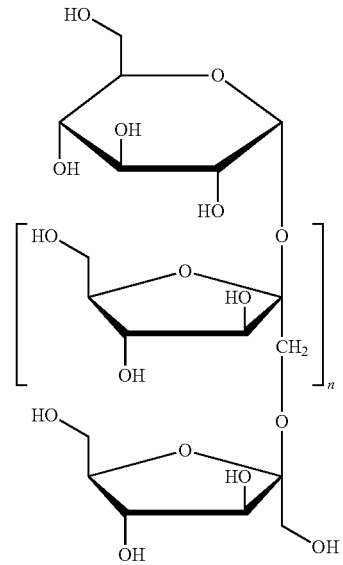

wherein n is any integer greater than 0; and
    (b) introducing the well fluid into the well.

2. The method according to claim 1, wherein the well fluid comprises a rhizome of the Compositae family of plants as a source of the inulin.

3. The method according to claim 1, wherein the well fluid comprises chicory as a source of the inulin.

4. The method according to claim 1, wherein the inulin is in the form of a particulate prior to the step of forming the well fluid.

5. The method according to claim 4, wherein the size of the particulate of the inulin is a powder.

6. The method according to claim 1, wherein the inulin is a concentration in the range of from about 0.01% wt/vol to about 5% wt/vol of the aqueous acid solution.

7. The method according to claim 1, wherein the well fluid is a suspension.

8. The method according to claim 1, wherein the well fluid is an emulsion.

9. The method according to claim 1, wherein the well fluid is a water-based fluid.

10. The method according to claim 1, wherein the well fluid comprises one or more additives selected from the group consisting of inorganic water-soluble salts, weighting agents, surfactants, surface modifying agents, gas, nitrogen, carbon dioxide, foamers, bases, buffers, alcohols, fluid-loss control additives, conventional corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, oxidizers, breakers, breaker aids, relative permeability modifiers, particulate materials, proppant particulates, resins, tackifying agents, wetting agents, coating enhancement agents, and any combination thereof.

11. The method according to claim 1, wherein the well fluid is introduced into the well at a rate and pressure that is at least sufficient to create at least one fracture in a subterranean formation of the well.

12. The method according to claim 1, further comprising the step of contacting a metal surface in the well with the well fluid.

13. The method according to claim 12, wherein the metal of the metal surface is selected from the group consisting of: J55 steel, N-80 steel, P-110 steel, 13Cr alloy, 25 Cr alloy, 825 alloy, and 316L steel.

14. The method according to claim 12, wherein the step of contacting is at a temperature of less than 270° F.

15. The method according to claim 1, further comprising the step of flowing back at least some of the well fluid from the well.

16. A method of inhibiting corrosion of a metal surface in a pipeline, the method comprising the steps of:
  (a) forming a pipeline fluid comprising:
    (i) an aqueous acid solution, wherein the aqueous acid solution contains an acid selected from the group consisting of: hydrochloric acid, hydrofluoric acid, formic acid, acetic acid, citric acid, and any mixture thereof present in the aqueous acid solution in an amount in the range of from about 2% to about 35% by weight of water in the solution; and
    (ii) inulin according to the following chemical structure:

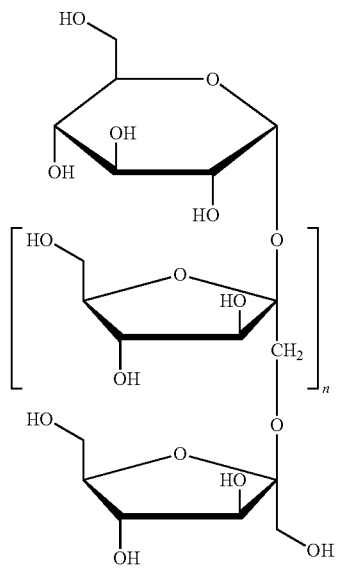

wherein n is any integer greater than 0; and
  (b) introducing the pipeline fluid into the pipeline.

17. The method according to claim 16, wherein the pipeline fluid comprises a rhizome of the Compositae family of plants as a source of the inulin.

18. The method according to claim 16, wherein the pipeline fluid comprises chicory as a source of the inulin.

19. The method according to claim 16, wherein the inulin is in the form of a particulate prior to the step of forming the pipeline fluid.

20. The method according to claim 16, wherein the inulin is a concentration in the range of from about 0.01% wt/vol to about 5% wt/vol of the aqueous acid solution.

21. The method according to claim 16, wherein the step of contacting is at a temperature of less than 270° F.

22. A method of inhibiting corrosion of a metal surface in a well, the method comprising the steps of:
  (a) forming a well fluid comprising:
    (i) an aqueous acid solution; and
    (ii) inulin according to the following chemical structure:

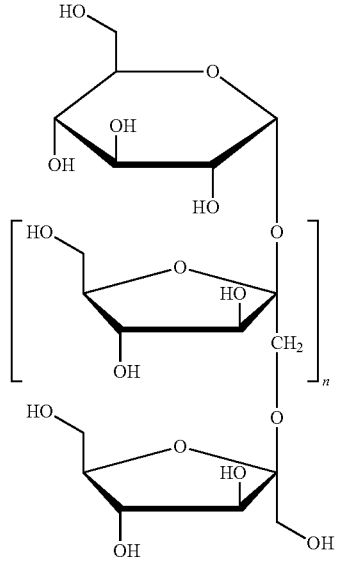

wherein n is any integer greater than 0;
  (b) introducing the well fluid into the well; and
  (c) contacting a metal surface in the well with the well fluid.

23. The method according to claim 22, wherein the metal of the metal surface is selected from the group consisting of: J55 steel, N-80 steel, P-110 steel, 13Cr alloy, 25 Cr alloy, 825 alloy, and 316L steel.

* * * * *